(12) United States Patent
Ecock et al.

(10) Patent No.: US 8,798,798 B2
(45) Date of Patent: Aug. 5, 2014

(54) SYSTEM AND METHOD FOR OPERATING STEAM SYSTEMS

(75) Inventors: Edward Gerard Ecock, Staten Island, NY (US); Josephine Aromando, Freehold, NJ (US); Charles Stuart Conroy, Lynbrook, NY (US); Dowlatram Somrah, New Hyde Park, NY (US); Wilket Ng, Flushing, NY (US); Aaron Williams, South Orange, NJ (US)

(73) Assignee: Consolidated Edison Company of New York, Inc., New York, NY (US)

( * ) Notice: Subject to any disclaimer, the term of this patent is extended or adjusted under 35 U.S.C. 154(b) by 560 days.

(21) Appl. No.: 13/069,508

(22) Filed: Mar. 23, 2011

(65) Prior Publication Data

US 2011/0236842 A1 Sep. 29, 2011

Related U.S. Application Data

(60) Provisional application No. 61/316,916, filed on Mar. 24, 2010.

(51) Int. Cl.
*G05D 7/00* (2006.01)
*F27D 19/00* (2006.01)

(52) U.S. Cl.
USPC .............. 700/282; 700/281; 432/1; 432/38

(58) Field of Classification Search
None
See application file for complete search history.

(56) References Cited

U.S. PATENT DOCUMENTS

| | | | |
|---|---|---|---|
| 5,687,755 A * | 11/1997 | Farquhar et al. | 137/182 |
| 6,102,617 A * | 8/2000 | Hampton | 405/52 |
| 7,416,137 B2 * | 8/2008 | Hagen et al. | 237/12.1 |
| 2004/0024544 A1 * | 2/2004 | Guebert et al. | 702/33 |
| 2004/0211272 A1 * | 10/2004 | Aronstam et al. | 73/866.5 |
| 2006/0122808 A1 * | 6/2006 | Quake et al. | 702/183 |
| 2006/0168962 A1 * | 8/2006 | Armitage et al. | 60/645 |
| 2008/0150737 A1 * | 6/2008 | Karschnia | 340/605 |
| 2010/0072293 A1 * | 3/2010 | Flynn et al. | 237/9 R |
| 2010/0153068 A1 * | 6/2010 | Armstrong et al. | 702/183 |
| 2010/0199672 A1 * | 8/2010 | Bellows | 60/660 |
| 2011/0000281 A1 * | 1/2011 | Deacon | 73/25.04 |

* cited by examiner

*Primary Examiner* — Sean Shechtman
(74) *Attorney, Agent, or Firm* — Cantor Colburn LLP

(57) ABSTRACT

A system and method for operating a steam system, such as a district heating system is provided with provisions for predicting potential water hammer conditions. The system measures steam parameters as inputs into a steam system engine. The steam system engine uses physics models and empirical steam flow behavior models to determine a condensate parameter such as rate of condensate generation and condensate levels within the system. When the condensate parameter exceeds a threshold, a signal is transmitted to the system operator so that actions may be taken to alleviate or prevent undesired conditions.

19 Claims, 4 Drawing Sheets

SYSTEM AND METHOD FOR OPERATING STEAM SYSTEMS

BACKGROUND OF THE INVENTION

The subject matter disclosed herein relates to a system for operating a steam system, and in particular relates to a system for predicting steam system properties and the locations of undesired conditions.

In large metropolitan areas, it is not uncommon for a central heating plant to be used to generate heat for multiple facilities in the surrounding area. This heating system is sometimes referred to as district heating or teleheating. The steam is transported via insulated pipes to subscribing buildings, which purchase the steam from the steam utility. Similar to an electric meter, a steam meter measures the amount of steam used by a particular building and the building owner is charged on a periodic basis.

The transfer of the steam from the central heating plant often results in the routing of steam pipes under streets and other areas. The steam pipes are insulated, and often enclosed within conduits to protect the insulation and steam pipes from the surrounding environment and to allow for thermal growth and movement of the pipes. During the normal course of transfer, some portion of the steam will condense back into liquid form. The condensed water is typically drained to the lowest point in the system where a device, such as a steam trap is installed. The steam trap is arranged to open when condensate is present and close in the presence of steam. The condensate is removed from the system to prevent a phenomena known as "water hammering" from occurring. Water hammering occurs if sub-cooled condensate backs up into the steam section of the system.

There are two types of water hammering: 1) slug type; and, 2) steam bubble collapse. In slug type water hammering, the high velocity steam propels a "slug" of condensate into a fitting such as an elbow that causes a change in the direction of the flow. The impact of the slug against the fitting creates a loud hammering noise and induces high stresses in the fitting and piping system. In the steam bubble collapse type of water hammering, cold or significantly subcooled condensate in a horizontal pipe or inclined pipe is put in motion by the differential pressure across the condensate. Due to the pitch of the pipe, steam flows over the sub-cooled condensate. The condensate rapidly condenses the steam and affects its velocity. The high velocity of the steam over the sub-cooled condensate creates waves in the surface of the condensate. A high enough wave will trap a steam bubble in the condensate. The suppressing of the steam bubble by the cold condensate causes a condensation-induced water hammer. The bubble collapse causes sharp pressure waves or water hammer. It should be appreciated that when water hammering occurs, undesired stresses to the piping system may result.

Unfortunately, in some circumstances the levels of condensate may collect in unexpected or unintended locations. When this occurs, the condensate may not be able to properly drain through a steam trap as desired. As a result, an unexpected water hammer event may occur.

Accordingly, while existing steam system arrangements are suitable for their intended purpose, there still remains a need for improvements particularly regarding the prediction of undesired conditions, such as condensate accumulation, and the identification of locations where the condensate is accumulating.

BRIEF DESCRIPTION OF THE INVENTION

According to one aspect of the invention, a district heating system is provided. The system includes a plurality of conduits, the plurality of conduits having a first conduit. A first sensor measures at least one first steam parameter associated with the first conduit. A controller is coupled to the first sensor to receive a first signal indicating the at least one first steam parameter. The controller having a processor that is responsive to executable instructions when executed on the processor for determining a first condensate parameter and first condensate location in the plurality of conduits in response to the first signal.

According to another aspect of the invention, a district heating system having at least one heating facility and at least one consuming facility is provided. The system having a plurality of conduits fluidly coupling the at least one heating facility with the at least one consuming facility. A plurality of valves are coupled to the plurality of conduits. A plurality of temperature sensors are coupled to the plurality of conduits, each of the plurality of temperature sensors disposed distally from each other. A plurality of pressure sensors are coupled to the plurality of conduits, each of the plurality of pressure sensors disposed distally from each other. A plurality of condensate level sensors are coupled to the plurality of conduits, each of the plurality of pressure sensors disposed distally from each other. A least one manhole water level sensor is arranged adjacent the plurality of conduits. A controller is coupled to communicate with the plurality of temperature sensors, the plurality of pressure sensors, the plurality of condensate sensors the at least one manhole water level sensor and the plurality of valves, the controller having a processor that is responsive to executable instructions when executed on the processor for determining a condensate parameter at a location within the plurality of conduits in response to receiving signals from the plurality of temperature sensors, the plurality of pressure sensors, the plurality of condensate sensors the at least one manhole water level sensor.

According to yet another embodiment of the invention, a method of operating a district heating system having at least one heating facility and at least one consuming facility is provided. The method includes measuring a steam parameter in a first conduit, the first conduit being fluidly coupled between the at least one hearing facility and the at least one consuming facility. The steam parameter is transmitted to a steam system engine. The steam system engine determines at least one parameter including condensate rate of generation, condensate flow rate or condensate level, wherein the at least one parameter associated with a condensate in the conduit. A first signal is generated when the at least one parameter exceeds a threshold.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Embodiments of the present invention provide a number of advantages in the efficient operation of a district heating type of system, or any other system having a steam distribution network. Embodiments of the invention provide advantages in predicting the location of potential water hammer conditions based on physical models using properties of steam, including but not limited to pressure, temperature and enthalpy for example. These predictions may be made at any location within the steam distribution system. The system incorporates hydraulic design information and real-time, or substantially real-time, data feedback from equipment such as flow meters, temperature sensors, thermocouples, level sensors, and pressure sensors in the distribution system. The measured data is integrated into an engineering model that includes factors such as but not limited to condensate flow behavior characteristics, pipe geometry, calculated pressure drop and calculated thermal losses. The output of the engineering model provides advantages in determining the location and generation rate of condensate in the system and as such may predict conditions that lead to water hammer. Based on this output, the system operators may proactively and preemptively dispatch service personnel to conduct maintenance procedures to eliminate or relieve undesirable conditions.

Figure 1:
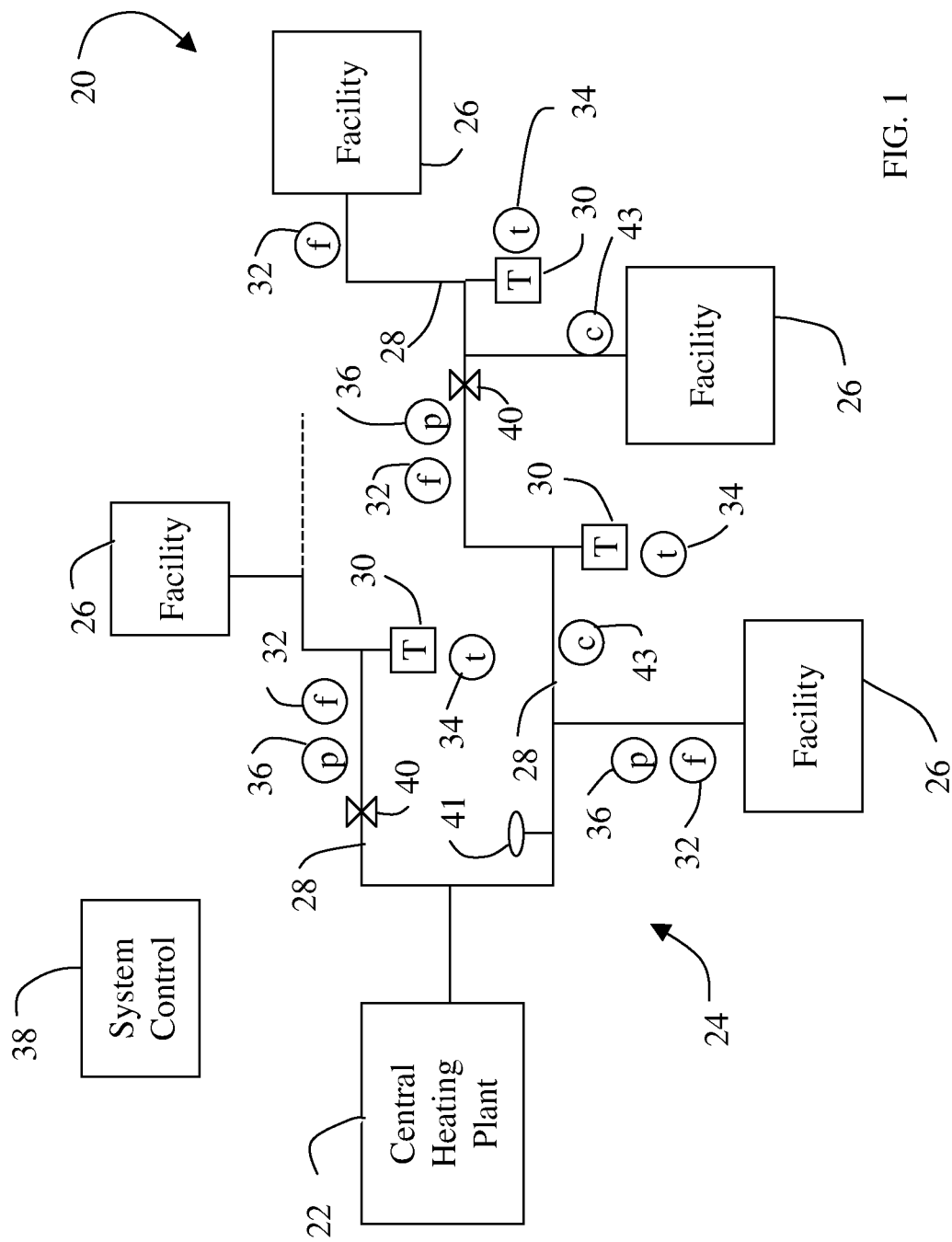
FIG. 1 is a schematic illustration of an exemplary district heating system in accordance with an embodiment of the invention.

Referring now to FIG. 1, an exemplary district heating system 20 is illustrated. The district heating system 20 includes a central heating plant 22 that generates heat, such as through the combustion of natural gas for example, and transfers the thermal energy to a medium that may be transported through a transfer system such as conduit network 24. In the exemplary embodiment, the heating plant 22 combusts a hydrocarbon based fuel, such as natural gas, oil or coal for example, to generate electrical power. Waste heat from the generation of electricity is used to convert water into steam. The steam is then moved via the conduit network 24 to consuming facilities 26 (e.g. office buildings, apartment buildings) where the thermal energy of the steam is transferred into the consuming facility in the form of heat. Once the heat is transferred to the consuming facility, the steam condenses into liquid water and is either used at the consuming facility, returned to the central heating plant 22 for reuse or discharged to a sewer system. It should be appreciated that while the exemplary embodiments herein discuss the district heating system 20 as having a single central heating plant 22, the claimed invention should not be so limited. The district heating system 20 may have multiple heating plants 22 connected to the conduit network 24 in parallel. These multiple heating plants 22 may be operated at different levels depending on the demand for thermal energy from the consuming facilities 26.

As the steam travels through the conduit network 24 to the consuming facilities 26, there are losses in the system that result in some of the steam transforming into a liquid condensate. In general, conduit networks 24 are arranged such that the individual conduits, such as conduits 28 for example, are pitched or sloped to facilitate the flow of condensate to desired collection points, such as steam traps 30 for example, where the condensate may be removed from the system. It should be appreciated that the presence of condensate in the conduit network 24 is undesired as under certain circumstances, the condensate and steam may interact causing what is known as "water hammering", which may result in damage to conduits 24 of the district heating system 22. As will be discussed in more detail herein, while the conduits are generally arranged to flow condensate under the force of gravity to the steam traps 30, in some operating conditions the condensate has been found to flow against the direction of gravity resulting in condensate collecting in undesired or unexpected locations.

Coupled to the conduit network 24 are a variety of sensors, such as but not limited to steam flow sensors 32, temperature sensors 34 and pressure sensors 36 for example. Further, in one embodiment the conduit network 24 may further include manhole water level sensors 41 and sensors 43 that detect condensate level in the steam mains. These sensors measure the operating conditions at discrete locations within the conduit network 24, wherein the individual sensors may be located distally from each other. In one embodiment, the steam trap 30 includes temperature sensors 34 that are used to determine the presence of a malfunctioning steam trap 30 as is described in co-pending patent application Ser. No. 12/608,330 entitled "Steam Trap Assembly and Method of Operation" filed on Oct. 10, 2009 which is commonly owned with the present application and is incorporated herein by reference in its entirety. In some embodiments, the conduit network 24 may further include control equipment, such as valves 40, that allow the network operator to control and effect changes in the district heating system 20. In some embodiments, the valves 40 may be remotely operated. The sensors 32, 34, 36 and valves 40 are equipped to transmit data to a control system 38.

In the exemplary embodiment, the control system 38 is a central control station having computer systems, communication systems and controllers suitable for monitoring and controlling the operation of the district heating system 20.

The control system 38 may include one or more computer systems, such as a computer server for example. The control system 38 communicates with the plurality network controllers, equipment and sensors described herein through a communications network. The communications network may be any type of known network including, but not limited to, a wide area network (WAN), a public switched telephone network (PSTN) a local area network (LAN), a global network (e.g. Internet), a virtual private network (VPN), and an intranet. The communications network may be implemented using a wireless network or any kind of physical network implementation known in the art.

In the exemplary embodiment, the control system 38 may be implemented using one or more servers operating in response to a computer program stored in a storage medium accessible by a user interface server. The control system 38 may operate as a network server (e.g., a web server) to communicate with the controllers, equipment and sensors. The control system 38 handles sending and receiving information to and from the controllers, equipment and sensors and can perform associated tasks. The control system 38 may also include firewalls or gateways to prevent unauthorized access and enforce any limitations on authorized access. For instance, an administrator may have access to the entire system and have authority to modify portions of the system. A gateway may be implemented using conventional hardware and/or software as is known in the art.

In the exemplary embodiment, the gateway provides a secure communication channel to the controllers, equipment and sensors. These secure communications channels provide a MIL Spec standards to prevent intrusion, interception or manipulation of data transmitted between the controllers, equipment and sensors and the gateway. In one embodiment, the gateway includes the ability to transmit and receive data from mobile devices, such as cellular phones for example, to notify the system operator and service personnel of alerts or opportunities related to the operation of the district heating system.

The gateway receives data and transmits data and commands. In the exemplary embodiment, the control system 38 includes a plurality of engines or modules as described herein. Each of the engines is capable of receiving a plurality of inputs and providing outputs. The outputs may be transmitted to a user interface or to the controllers, equipment and sensors. Similarly, the inputs may be received from the user interface or the controllers, equipment and sensors. It should be appreciated that as used herein, the term "engines", "modules" or "systems" may be implemented in a variety of forms including hardware, firmware, software or any combination thereof.

In the exemplary embodiment, the user interface receives data from the engines and the gateway and transforms the data into a visual representation on a display, as such the user interface may include an LED (light-emitting diode) display, an LCD (liquid-crystal diode) display, a CRT (cathode ray tube) display, or the like. A keypad may also be coupled to the user interface for providing data input to the control system 38.

In one embodiment, the user interface transforms physical data of the district heating system 20 in a visual display. The visual display may be a window, illustrating a graphical representation of a metric indicating a status of the district heating system 20, such as in the form of a stacked line graph for example. The metric may be the amount of condensation at a particular portion of the conduit network 24 for example. The use of a window having a graphical representation allows the network operator to quickly ascertain the current condition of the district heating system. For example, in the embodiment where the window is displaying the conditions of level of condensation, if the operator sees that a portion of the conduit network 24 is operating at a higher level, this may indicate a problem on that portion of the conduit network 24. Left unabated, the conduit network operating at the higher condensation level may experience water hammering that result in a loss of steam or damage to the conduits for example. The user interface allows the network operators to further interrogate the operating conditions on the conduit network 24 to ascertain the reason for the increase in condensation levels.

It should be appreciated that while the exemplary embodiment describes the control system 38 as being a single control center, the claimed invention should not be so limited. In some embodiments, the control system 38 is a distributed control architecture wherein the monitoring and control functionality is configured in multiple locations that cooperate to operate the district heating system 20.

Figure 2:
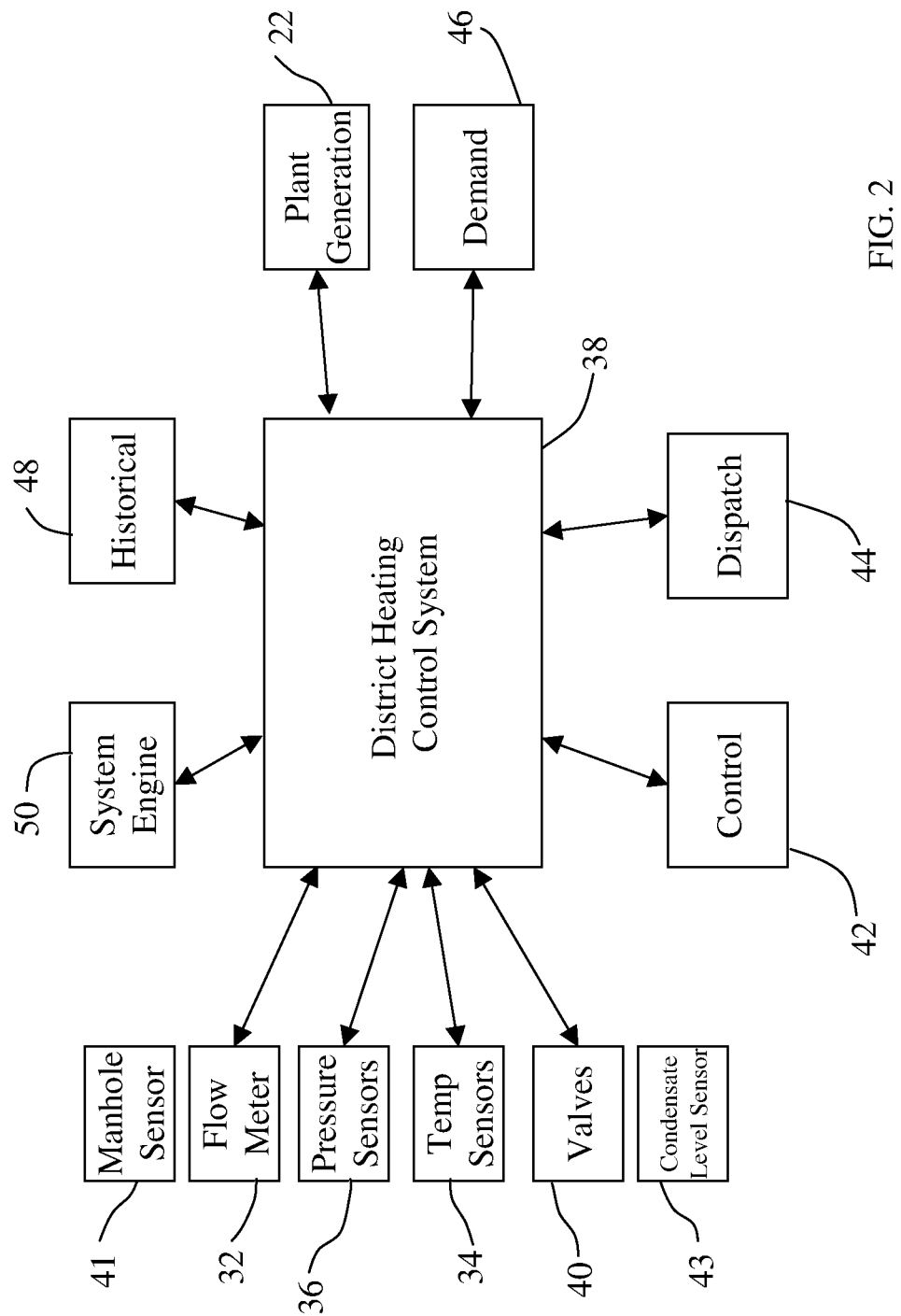
FIG. 2 is a schematic illustration of an exemplary controller for the district heating system of FIG. 1.

Referring now to FIG. 2, an embodiment of the control system 38 is illustrated. The control system 38 includes a processor having input/output interfaces allow the control system 38 to interact with one or more operator interfaces 42 and dispatch systems 44. The dispatch system 44 allows the control system 38 to send service personnel to perform preventive maintenance and other tasks on the conduit network 24. In addition to dispatching personnel, in some embodiments the control system 38 may actuate valves 40 to isolate or reroute the flow of steam around an undesired location The control system 38 also connects to receive data from the sensors 32, 34, 36. In one embodiment, the control system 38 may also be connected to transmit data and instructions to the sensors 32, 34, 36, 41, 43 such as for calibration or to determine the health of the sensor for example. The control system 38 also receives and transmits data and instructions to the central heating plant 22 and the facilities 26. In the exemplary embodiment, the control system 38 receives actual and predicted demand data 46 from the facilities, such that the control system 38 may forecast the amount of steam that will be needed and ensure that enough generation capacity is available. In one embodiment, the control system 38 may transmit instructions to the facilities to reduce demand in the event that sufficient capacity generation is not available, or if preventative actions are being implemented due to alleviate an undesired condition, such as a buildup of condensation for example.

The control center 38 stores and retrieves data, including sensor 32, 34, 36, 41, 43 data and demand data 46 in a historical database 48. The data from historical database 48 may be used to create forecasts to predict demand depending on a variety of factors, including the day of the week, the time of day and the weather for example or may be used to calibrate the steam system engine 50 or the sensors 32, 34, 36, 41, 43. The control center 38 is also connected to a steam system engine 50. As will be discussed in more detail herein, the steam system engine 50 uses physics engines and empirical steam flow engines to determine parameters of the steam within the conduit network 24. These parameters, which include but are not limited to pressure, temperature, enthalpy, steam flow, rate of condensation generation, condensation level and condensation flow behavior for example, at any point within the conduit network 24.

Figure 3:
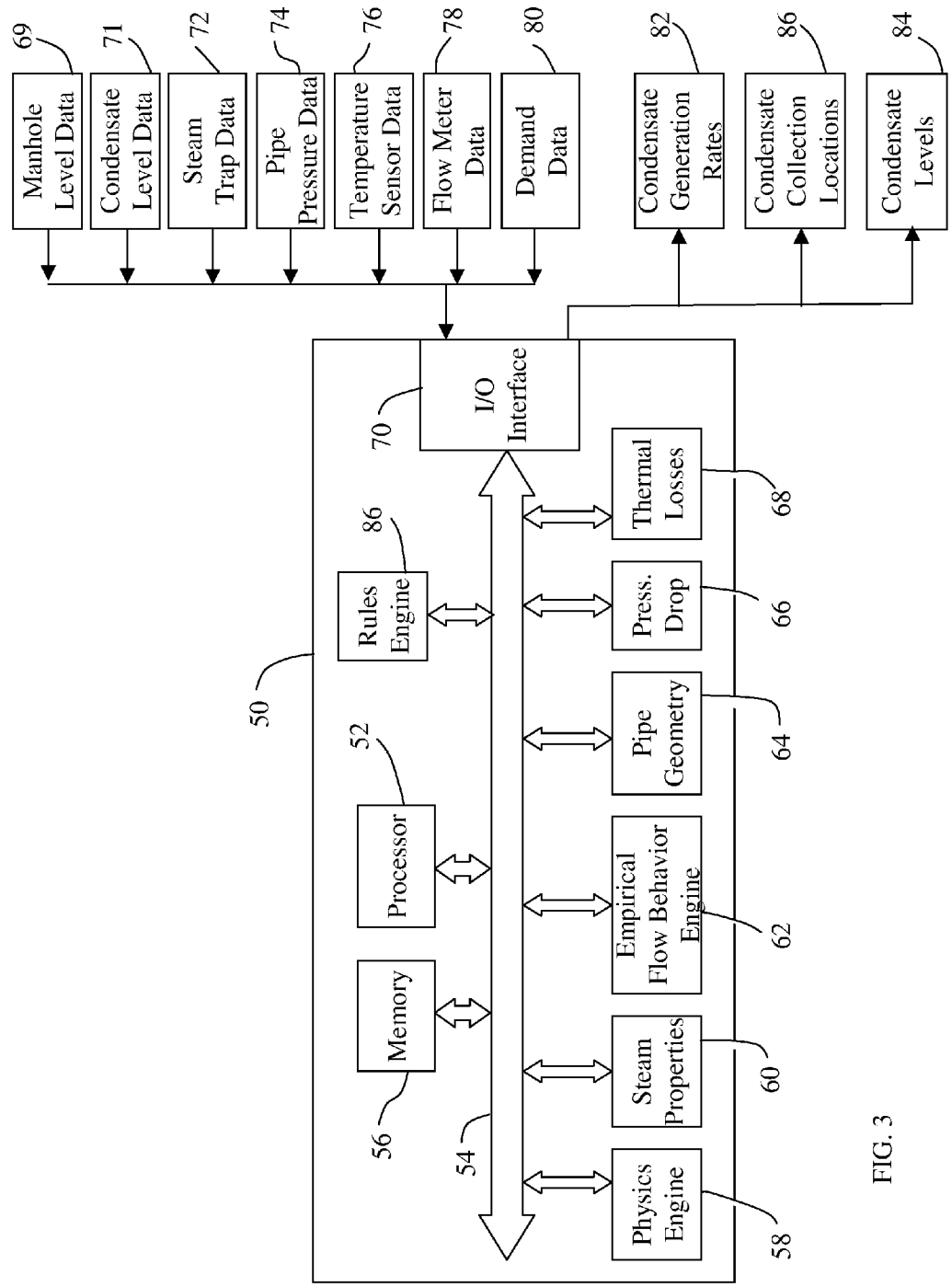
FIG. 3 is a schematic illustration of an exemplary system engine for the controller of FIG. 2; and, FIG. 4 is a flow diagram of an exemplary method of operating the district heating system of FIG. 1.

The steam system engine 50 receives data from the control center 38. Alternatively, the steam system engine 50 may operate independently of the control center 38 and receive the input data directly. One embodiment of the steam system engine 50 includes, as shown in FIG. 3, a processor 52 that connects via a bus 54 to other components and with outside sources.

The processor 52 connects via the bus 54 with memory 56 which holds computer readable instructions therein that are able to perform operations, such as determining physical parameters of the steam and communicating with outside sources for example, as well as implementing physics engine 58, steam properties engine 60, empirical steam flow behavior engine 62, pipe geometry engine 64, pressure drop engine 66, and thermal losses engine 68. Further, the computer readable instructions originally held in memory 56 and executed on the processor 52 may include the method illustrated in FIG. 4. The bus 54 connects with an Input/Output Interface 70 to facilitate communication with outside sources, such as control center 38 for example. In one embodiment, the processor 52 communicates with operator interface 42 and provides a graphical representation of the steam parameters in the conduit network 24.

The steam system engine 50 receives a variety of inputs, including but not limited to: manhole water level data 69; condensate level data 71; steam trap data 72; pipe pressure data 74; temperature sensor data 76; flow meter data 78; and, demand data 80. In one embodiment, some of this data is received from sensors 32, 34, 36, 41, 43 for example. The data is used by processor 52 to determine different parameters that are desired by the system operator, such as condensate generation rates 82, condensate levels 84 and condensate locations 86. The output provided by the steam system engine 50 provides the system operator with the information needed to determine the potential for undesirable conditions within the conduit network 24 and take appropriate actions, such as dispatching service personnel to close valves 40 for example, to alleviate the underlying conditions prior to the undesirable condition occurring.

In one embodiment, the physics engine 58 receives data from the bus 54 and analytically determines steam parameters for all or substantially all locations within the conduit network 24. The physics engine uses fluid behavior models to determine some of the steam parameters. The physics engine may have models that include, but are not limited to: heat transfer models for radiant, convective, and conductive heat transfer; fluid statics; fluid dynamics including two-phase flow and compressible liquids; thermodynamics of steam; and libraries for providing three-dimensional computer representations of the system and its associated parameters. The physics engine 58 may also incorporate parameters determined by other engines, such as empirical steam flow behavior engine 62, and hydraulic information (e.g. pressure drop) for the conduit network 24. The behavior engine 62 uses the inputs to determine steam parameters that do not directly correlate with physics fluid models. For example, it has been observed that under some conditions within a steam system, condensate may not flow in the direction of the pitched/sloped conduit, but rather will flow against gravity in the opposite direction. It has been found that depending on the velocity of the steam, condensate may behave counter intuitively and flow against gravity (e.g. against the slope of the conduit), become annular, or flow in a direction with higher resistance.

Physics engine 58 may also receive inputs from pipe geometry engine 64 provides information on the piping used within conduit network 24. Similarly, inputs may be received from pressure drop engine 66 and thermal losses engine 68, which determine the loss of pressure and thermal effect that result in condensate being formed within the conduit network 24.

The processor 52 combines the steam parameters determined by the physics engine 58 and the other engines and presents the data to the system operator via the operator interface 42. The processor 52 may also compare the steam parameters with predetermined thresholds, such as maximum allowable condensate level or a maximum conduit pressure for example, and provide indicators or alarms to notify the system operator. Further, the processor 52 may be used as a prediction engine for hypothetical scenarios and provide predicted output parameters if a particular action (e.g. rerouting of steam) were taken. In one embodiment, the steam system engine 50 includes a rules based engine 86 that executes predetermined hypothetical responses upon detection of an undesired condition. The results of the predetermined hypothetical responses may then be presented to the system operator via the operator interface 42 along with the notification of a potential undesired location. This provides advantages in reducing the reaction time of the system operator as they will be able to determine from the results of the hypothetical responses what actions to take. In another embodiment, the rules engine 86 executes the predetermined hypothetical responses and from the logic incorporated in the rules engine 86, selects a desired response (e.g. dispatch personnel, or modify demand) and then automatically provides outputs to implement the desired response.

It should be appreciated that the steam system engine 50 may be continuously receiving inputs in real time, or substantially real time, and may be continuously updating the operator interface 42 with the steam parameters. Further, the engines 58-68, 86 may incorporate machine learning and pattern recognition algorithms to assist in analysis of data, such as that described in co-pending, commonly assigned U.S. patent application Ser. No. 12/178,553 by Arthur Kressner, Mark Mastrocinque, Matthew Koenig and John Johnson which is incorporated by reference in its entirety. These engines 58-68, 86 may further incorporate rules based decision logic, such as business operation rules and safety rules and associated support algorithms to assist the electrical network operator.

Figure 4:
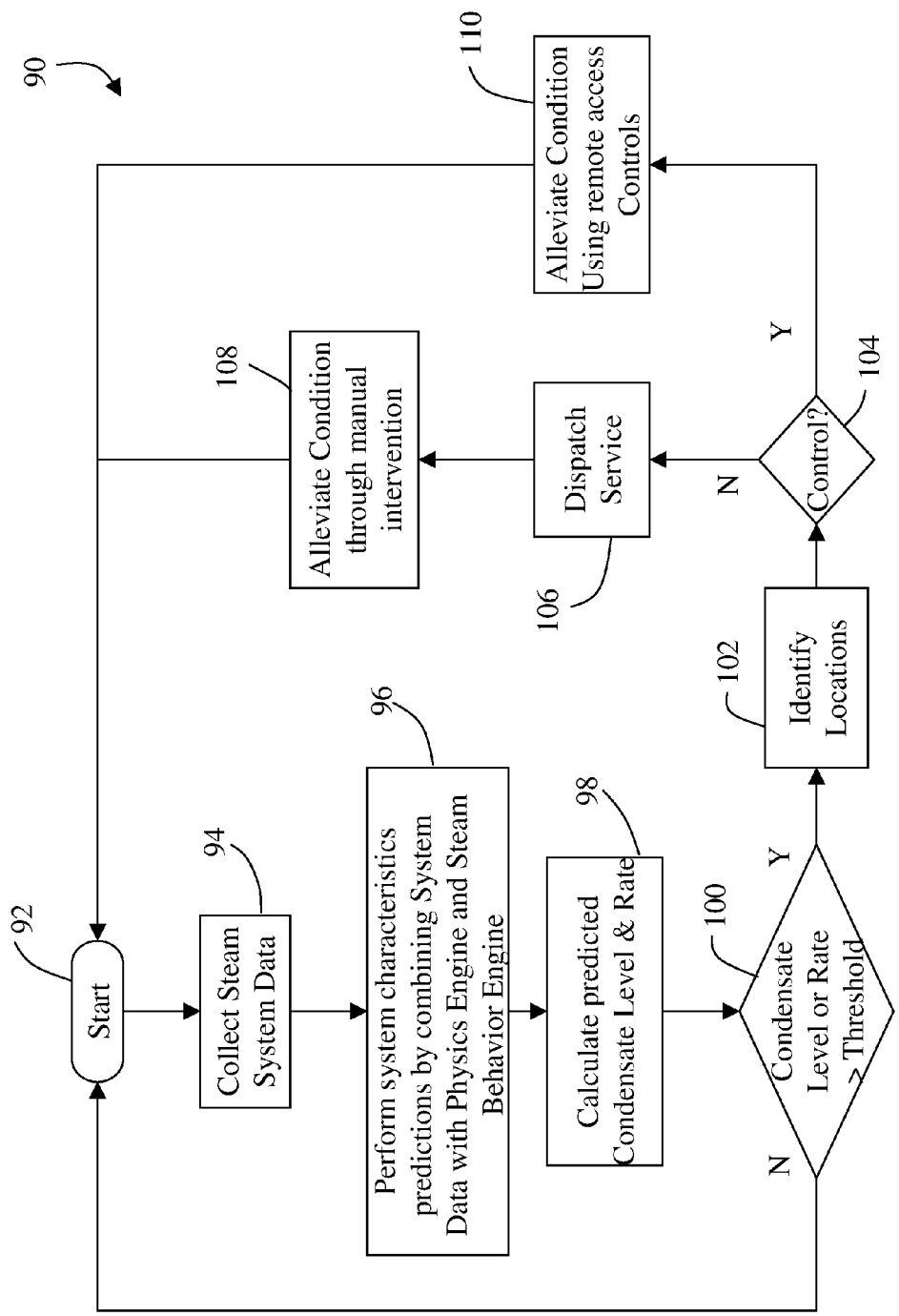

One method 90 of operating the district heating system 20 is illustrated in FIG. 4. The method 90 starts in start block 92 and proceeds to block 94 where data from the sensors in the conduit network 24 are aggregated. The method 90 then proceeds to block 96 where system characteristics predictions by performed combining system data, such as from sensors 32, 34, 36 for example, with physics engine 58 and steam behavior engine 62. With the steam parameters determined, the method 90 moves to block 98 where the level, location and rate of condensate is determined. The method then proceeds to query block 100 where the condensate parameters (e.g. condensate level) are compared against predetermined thresholds. If the query block 100 returns a negative, the method 90 loops back to start block 92 and begins the process again.

If the query block 100 returns a positive, the method 90 proceeds to block 102 where the locations of the undesired conditions are identified, such as with an alarm to the system operator for example. In query block 104, it is determined whether the condition may be alleviated through the use of remote equipment or if manual intervention by service personnel is needed. If query block 104 returns a negative, service personnel are dispatched in block 106 and the condition is alleviated in block 108. If query block 104 returns a positive, the appropriate remote equipment (e.g. valves) are actuated in block 110. With the condition alleviated, the method 90 loops back to start block 92.

It should also be appreciated that while the exemplary embodiments provided herein refer to condensate parameters, this is for exemplary purposes and the claimed invention should not be so limited. The measurement of other physical parameters may also be determined In one embodiment, the steam system engine determines thermal heat loss at locations over time for the identification of deteriorating insulation or other disruptions in the environment of the district heating system. Embodiments of the present invention may also provide advantages in detecting and locating unaccounted for losses, for planning maintenance work, for identifying low or null velocities, for identifying equipment not configured in a normal operating condition, operating errors or for economic dispatch.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks. A technical effect of the executable instructions is to manage a steam system or district heating system by collecting data, analyzing the data and presenting results.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A district heating system have a steam source and a distal heat load, the system comprising:
   a plurality of conduits configured to transfer steam from the steam source to the distal heat load, the plurality of conduits disposed below ground level, the plurality of conduits having a first conduit, the first conduit having a first end and a second end, the second end being vertically lower than the first end, the steam flowing from the first end to the second end;
   a first sensor measuring at least one first steam parameter associated with the first conduit between the first end and the second end;
   a steam trap operably coupled to the second end;
   a controller coupled to the first sensor to receive a first signal indicating the at least one first steam parameter, the controller having a processor that is responsive to executable instructions when executed on the processor for determining a movement of condensate towards the first end and a first condensate location in the first conduit based at least in part on the first signal.

2. The system of claim 1 wherein the first sensor is a steam flow sensor.

3. The system of claim 1 wherein the first steam parameter is a velocity of the steam.

4. The system of claim 3 further comprising:
a second sensor measuring a temperature associated with the first conduit, the second sensor coupled to transmit a second signal to the controller;
a third sensor measuring a manhole water level proximate the first conduit, the third sensor coupled to transmit a third signal to the controller;
a fourth sensor measuring steam pressure associated with the first conduit, the fourth sensor coupled to transmit a fourth signal to the controller;
at least one first valve coupled to the first conduit and coupled for communication to the controller; and,
wherein the processor is further responsive to executable computer instructions for automatically close the at least one first valve in response to the first signal, the second signal, the third signal and the fourth signal.

5. The system of claim 4 wherein the controller is coupled to communicate with at least one facility, and the processor is further responsive to communicating a demand reduction signal to the at least one facility in response to closing the at least one first valve.

6. The system of claim 5 wherein the plurality of conduits includes a second conduit arranged in parallel with the first conduit.

7. The system of claim 6 further comprising at least one second valve coupled to the second conduit, wherein the processor is further responsive to executable computer instructions for actuating the at least one second valve to route steam through the second conduit in response to the closing of the at least one first valve.

8. A district heating system having at least one heating facility and at least one consuming facility, the system comprising:
a plurality of conduits fluidly coupling the at least one heating facility with the at least one consuming facility, the plurality of conduits being arranged below ground level;
a plurality of valves coupled to the plurality of conduits;
a plurality of temperature sensors coupled to the plurality of conduits, each of the plurality of temperature sensors disposed distally from each other;
a plurality of pressure sensors coupled to the plurality of conduits, each of the plurality of pressure sensors disposed distally from each other;
a plurality of condensate level sensors coupled to the plurality of conduits, each of the plurality of pressure sensors disposed distally from each other;
at least one manhole water level sensor arranged adjacent the plurality of conduits;
at least one steam flow sensor; and,
a controller coupled to communicate with the plurality of temperature sensors, the plurality of pressure sensors, the plurality of condensate sensors the at least one manhole water level sensor and the plurality of valves, the controller having a processor that is responsive to executable instructions when executed on the processor for determining a condensate flowing against gravity at a location within the plurality of conduits based at least in part in response to receiving signals from the plurality of temperature sensors, the plurality of pressure sensors, the plurality of condensate sensors, the at least one steam flow sensor, and the at least one manhole water level sensor.

9. The system of claim 8 wherein the controller includes a physics engine coupled to communicate with the processor, the physics engine having at least one fluid model, a steam properties engine coupled to communicate with the processor, and an empirical flow behavior engine coupled to communicate with the processor, wherein the behavior engine is configured to determine steam parameters that do not correlate with the at least one fluid model.

10. The system of claim 9 wherein the processor determines a condensate parameter that includes a condensate level and a condensate rate, and the processor is further responsive to executable computer instructions for determining when the condensate level exceeds a first threshold.

11. The system of claim 10 wherein the processor is further responsive to executable computer instructions for determining when the condensate rate exceeds a second threshold.

12. The system of claim 10 wherein the processor is further responsive to executable computer instructions for actuating at least one of the plurality of valves in response to the determining the first threshold was exceeded.

13. The system of claim 11 wherein the processor is further responsive to executable computer instructions for actuating at least one of the plurality of valves in response to the determining the second threshold was exceeded.

14. The system of claim 9 wherein the controller is coupled to receive actual demand data and a predicted demand data from the at least one consuming facility, and wherein the processor is further responsive to executable computer instructions for transmitting a forecast signal to the at least one heating facility in response to the actual demand data and the predicted demand data.

15. A method of operating a district heating system having at least one heating facility and at least one consuming facility, the method comprising:
measuring a steam parameter in a first conduit, the first conduit being fluidly coupled at least partially below ground level between the at least one heating facility and the at least one consuming facility;
transmitting the steam parameter to a steam system engine;
determining with the steam system engine at least one parameter including steam velocity, condensate rate of generation, condensate flow rate or condensate level, wherein the at least one parameter associated with a condensate in the first conduit;
determining with a behavior engine that the at least one parameter does not correlate with a physics fluid model;
determining a condensate will flow against gravity within the first conduit based on determining with the behavior engine that the at least one parameter does not correlate with a physics fluid model; and,
generating a first signal based at least in part on determining the condensate will flow against gravity.

16. The method of claim 15 further comprising closing at least one first valve in response to the first signal and flowing steam through a second conduit when the at least one first valve is closed, wherein the second conduit is fluidly coupled between the at least one heating facility and the at least one consuming facility.

17. The method of claim 16 further comprising transmitting a second signal to the at least one consuming facility when the at least one parameter exceeds a threshold.

18. The method of claim 15 further comprising determining at least one hypothetical response when the at least one parameter exceeds a threshold.

19. The method of claim 18 further comprising:
determining a location of condensate in the first conduit when the at least one parameter exceeds a threshold; and, presenting the at least one hypothetical response and the location of condensate to an operator when the at least one parameter exceeds a threshold.

\* \* \* \* \*